United States Patent [19]

Kreusch et al.

[11] Patent Number: 4,747,945
[45] Date of Patent: May 31, 1988

[54] LIGHTWEIGHT MEDIA DEPTH FILTER

[75] Inventors: Edward G. Kreusch, Arlington Heights; John M. Scanlan, Glenview, both of Ill.

[73] Assignee: Culligan International Company, Northbrook, Ill.

[21] Appl. No.: 72,915

[22] Filed: Jul. 14, 1987

[51] Int. Cl.$^4$ .............................................. B01D 23/10
[52] U.S. Cl. .................................................. 210/290
[58] Field of Search ............ 210/263, 275, 290, 502.1, 210/503

[56] References Cited

U.S. PATENT DOCUMENTS

| | | | |
|---|---|---|---|
| 293,745 | 2/1884 | Hyatt | 210/290 |
| 3,343,680 | 9/1967 | Rice et al. | 210/263 |
| 3,471,025 | 10/1969 | Dobson | 210/290 |
| 3,876,546 | 4/1975 | Hsiung et al. | 210/275 |
| 4,197,205 | 4/1980 | Hirs | 210/275 |

OTHER PUBLICATIONS

Title: The Rowpu Prefiltration System Removal of Microorganisms Mitchell J. Small et al., (Mar., 1982), Cover page, pp. 41 and 10.
Installation and Operating Data Models HQ 20, HQ 24 and HQ 30, 1 page.

*Primary Examiner*—Ivars Cintins
*Attorney, Agent, or Firm*—George H. Gerstman

[57] ABSTRACT

A depth filter comprises a filter column having opposed inlet and outlet ends containing particulate material. The particulate material is selected in such a manner to provide a lightweight filter which retains equivalent high performance to heavier filters.

18 Claims, 1 Drawing Sheet

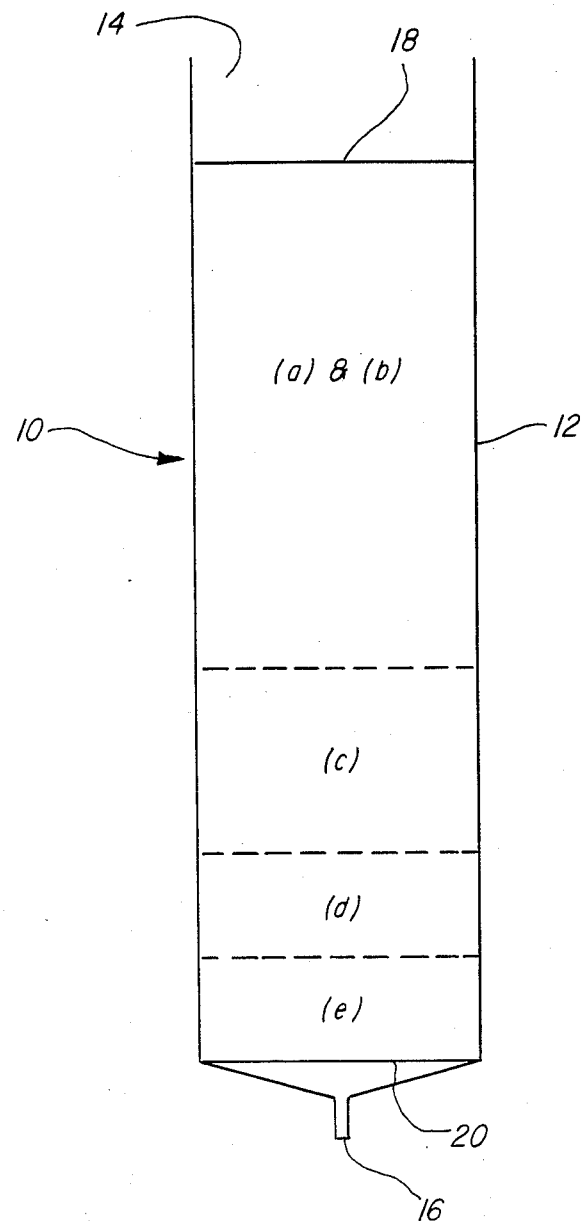

LIGHTWEIGHT MEDIA DEPTH FILTER

BACKGROUND OF THE INVENTION

Large depth filters of layers of particulate material are used to remove turbidity from water and the like. For example, the Culligan International Company of Northbrook, Ill. offers Models HQ20, HQ24, and HQ30 depth filters capable of purifying water at flow rates ranging from 50 gallons per minute to 120 gallons per minute.

While depth filters such as these are very effective for their purpose, they do exhibit the disadvantage of being of heavy weight. For example, the U.S. Army makes use of a Reverse Osmosis Water Producing Unit which incorporates a standard particulate depth filter weighing between 2100 and 2200 pounds. Such a heavy weight obviously has a significant influence on the transportability of such Reverse Osmosis Water Producing Units, particularly their air-transportability.

One reason that such large depth filters must be so heavy is that the various layers of particulate material must be of generally increasing density from top to bottom, to permit them to restratify after back washing, which is the periodic process used to remove collected filter residue from the filter. Accordingly, the lower portions of particulate material in conventional depth filters are relatively heavy.

In accordance with this invention, a depth filter is provided which can be of a weight down to one-half of the weight of corresponding conventional depth filters, while exhibiting performance which is quite comparable to that of the heavier depth filters.

DESCRIPTION OF THE INVENTION

The depth filter of this invention comprises a filter column having an opposed inlet and outlet, the filter column containing particulate material. In accordance with this invention, the particulate material is present in the filter column in the following types and proportions:

(a) Adjacent the inlet, there is optionally present up to about 12 volume percent of a particulate material having an effective particle size of about 5 to 8 mm., a density of about 30 to 50 pounds per cubic foot, and an $ES/D$ of about 0.1 to 0.2. The term $ES/D$ is the effective size of the particles in the particulate material divided by the density of the material, as used here and subsequently. The "effective size" of a particulate material is that opening in millimeters that passes 10 percent of the particulate material being tested.

Specifically, one particular material which may be used for this ingredient (a) is Cullsan P, a polyester material sold by Culligan International Company having an effective size of 6.1 to 6.3 mm. and a density of about 44 pounds per cubic foot. Thus the $ES/D$ ratio is about 0.13 to 0.14. Approximately 8 to 10 volume percent of this material is preferably present, when it is used. The material sits at the top of the column, having a relatively large particle size, and serving to disperse the fine particles of the next ingredient, with which it is commingled.

A specific depth filter of this invention may have a total of 34 inches of particulate material, of which the equivalent of 3 inches is Culsan P ingredient.

(b) Adjacent to the material of (a) above, and typically commingled with it, is a portion of the depth filter comprising 30 to 70 volume percent of a particulate material having an effective particle size of about 1 to 2 mm., a density of about 20 to 50 pounds per cubic foot, and an $ES/D$ of about 0.04 to 0.07. This material may be made of activated carbon. A preferred species of such material is sold by Culligan International Company under the trademark Cullar F. This particular material has an effective size of about 1.6 mm. and the density of about 30 pounds per cubic foot, to have an $ES/D$ of 0.053. The material is made of activated carbon, and, preferably, about 40 to 60 volume percent of the total particulate material present is part of ingredient (b). Specifically, 47 volume percent of such material may be present, or an equivalent of 16 inches of the 34 inch height of the particulate mass in the specific depth filter disclosed herein.

(c) Adjacent the material of (b) above and generally spaced from the inlet (being separated from the inlet by the materials (a) and (b)) from 15 to 30 volume percent of a particulate material may be present having an effective particle size of about 0.4 to 0.8 mm., a density of about 40 to 55 pounds per cubic foot, and an $ES/D$ of about 0.01 to 0.02. Specifically, the material may be a slag product sold under the name of Cullsorb C by Culligan International Company. This particulate material has an effective size of about 0.61 mm. a density of about 49 pounds per cubic foot, and an $ES/D$ ratio of about 0.012. Typically, about 18 to 25 percent of the particulate material in the filter column may be the material of portion (c). Specifically, an equivalent of 7 inches out of the total 34 inch height of the column is occupied by this material, corresponding to a volume percentage of 20.6 percent.

(d) Adjacent the material of (c) above, and generally spaced from the material of (b) above by the material of (c), a region of particulate material is provided comprising from 5 to 15 volume percent of the total particulate material in the filter column. This particulate material has an effective particle size of about 0.35 to 0.5 mm., with the particle size being smaller than the particle size of region (c) above. Also, the particulate material of region (d) has a density of about 80 to 110 pounds per cubic foot, and an $ES/D$ of about 0.001 to 0.01.

Specifically, the material may be Cullsan A, sold by Culligan International Company. This material has an effective size of about 0.43 mm., a density of about 92 pounds per cubic foot, and a resulting $ES/D$ of about 0.005. The material of this region (d) may constitute a calcined aluminum silicate. Specifically, this region (d) may constitute about 10 to 13 volume percent of the entire particulate material in the filter column. Specifically, about 4 inches of the 34 inch height of particulate material in the filter column may constitute this region (d).

(e) At the bottom of the column of particulate material adjacent region (d) and adjacent the outlet, from 5 to 15 volume percent of a particulate base or support material is provided. Preferably, this particulate material may have a effective particle size of 1.5 to 5 mm. and a density that exceeds the density of the other materials in the column, for example a density of 95 to 120 pounds per cubic foot.

It is generally preferred for the individual particles of region (e) to have one dimension that is an average of one third to two thirds less than the other two dimensions of the particles, to cause the particles to be plate like in characteristic and to lie together in generally laminar manner to support the other particulate material in the filter column. Specifically, such a material is available from the Culligan International Company as Cullsan U, having an effective particle size of about 1.8 mm., a density of about 105 pounds per cubic foot, and a resulting $ES/D$ of 0.017. Cullson U is made of crushed granite.

It can be seen that the preferred ingredients for the layers of particulate material in the filter column according to this invention permit liquid passing from the inlet to the outlet to pass through a series of particles of generally decreasing size after region (a), when present, and typically prior to region (e), for depth filtration of a gradated type. This provides sequentially decreasing flow passage sizes, for selective filtration as liquid advances downwardly through the column.

Additionally, it is preferred for the materials of regions (c), (d), and (e) particularly to be sequentially and respectively of increasing densities, to maintain substantial stratification of the regions upon back washing of the depth filter. Futhermore, the densities of the materials of these three regions should each be greater than the densities of the materials of regions (a) and (b) which are preferably commingled so that the larger sized particles or region (a) can be intermixed with the particles of region (b) to assist in opening flow channels therethrough.

DESCRIPTION OF THE DRAWING

FIG. 1 is a schematic view of a depth filter in accordance with this invention.

DESCRIPTION OF SPECIFIC EMBODIMENT

Referring to FIG. 1, a schematic view of a depth filter 10 is shown, having a filter column 12 with inlet 14 at the top and outlet 16 at the bottom. In actuality, various designs are available for depth filters which are more complex than that shown, but which are functionally equivalent. For example, several designs of such filters are available from Culligan International Inc., which filters may be modified in accordance with this invention. However, since their structures are well known, they are not specifically described in this application. Hence, the structure of FIG. 1 is intended to be merely a schematic flow diagram of any desired particulate matter depth filter of any desired structure.

Filter column 12 is filled with particulate matter, with an upper surface 18 of the particulate matter and a lower end 20 thereof as shown. Beginning with upper surface 18, the regions (a) and (b) as described above are shown in commingled relation. Basically, in the specific depth filter 10 which is shown, the distance from top 18 to bottom 20 of the column of particulate matter is 34 inches. Of that, the top 19 inches constitute the commingled regions (a) and (b), with an equivalent of 3 inches of the height constituting Cullsan P and the remaining 16 inches constituting Cullar F, these materials being described above. Below regions (a) and (b) in the column lies region (c) which is 7 inches in depth, and constitutes Cullsorb C, which has also been previously described.

Region (d) below Cullsorb C, may constitute Cullsan A, previously described, and is 4 inches in depth.

Region (e) the base layer, may constitute Cullsan U, also previously described, and is also 4 inches in depth.

The resulting depth filter may be operated in conventional manner and may likewise be back washed in conventional manner, the variable densities of the various layers permitting restratification of the system to maintain descrete layers (c), (d) and (e) with the commingled layers (a) and (b) on top. The resulting column of particulate matter within column 12 has an average weight of 145.7 pounds per square foot of area, which constitutes a very significant reduction in overall weight, when comparing the related, commercially available particulate matter depth filters. One such commercially available particulate matter depth filter, for example, has a column of particulate material that weighs 250.4 pounds per square foot of area. The weight of particulate matter of the filter of this invention is only about 58 percent of the weight of that prior art filter. Nevertheless, the performance characteristics of the filter of this invention, in terms of flow rates and filtering capacity, is substantially equivalent to that of the heavier prior art filters of equivalent size.

The specific prior art filter mentioned above has a column of particulate material having a depth of 35½ inches, having an upper layer of 19½ inches of commingled Cullsan P (3 inches) and including 16½ inches of an anthracite coal particulate having an effective particle size of 0.82 mm. and a density of 52 pounds per cubic foot (Cullcite, sold by Culligan International Company). The next layer down constitutes 6 inches of Cullsan A, described above. The following layer down the column constitutes 3 inches of Cullsan G-50, a material sold by Culligan International Company having an effective particle size of 0.42 mm. and a density of 135 pounds per cubic foot, this material being commingled with 3 inches of an underbedding material sold by Culligan and bearing the tradename of Cullsan G-12 (having an effective size of 2.0 mm. and a density of 135 pounds per cubic foot. Additionally, the underbedding contains 4 inches of medium gravel (effective size 4.8 mm.; density 100 pounds per cubic foot).

Accordingly, the depth filter of this invention shows significant advantage over depth filters of the prior art in that equal performance can be achieved even though the depth filter of this invention has a very significantly reduced weight when compared with the prior art depth filters, which permits more versatile use and greater portability of the filter of this invention.

The bottom region (e) as described above, may be replaced with any desired liquid-permeable bottom support means, if the advantages of the specifically disclosed region (e) are not required. For example, a slotted manifold or cast sand may be used, or any other means for keeping the particulate material out of the liquid flowing out of outlet 16.

The above has been offered for illustrative purposes only, and is not intended to limit the scope of the invention of this application, which is as defined in the claims below.

That which is claimed is:

1. In a depth filter which comprises a filter column having an opposed inlet and outlet, said filter column containing particulate material, the improvement comprising, in combination:

said particulate material being present in said filter column in the following types and proportions:
(a) adjacent the inlet end, from 0 to 12 volume percent of a particulate material having an effective particle size of 5 to 8 mm., a density of 30 to 50 pounds per cubic foot, and an $ES/D$ of 0.1 to 0.2;
(b) adjacent the material of (a) above, from 30 to 70 volume percent of a particulate material having an effective particle size of 1 to 2 mm., a density of 25 to 50 pounds per cubic foot, and an $ES/D$ of 0.04 to 0.07;

(c) adjacent the material of (b) above and generally spaced from said inlet, from 15 to 30 volume percent of a particulate material having an effective particle size of 0.4 to 0.8 mm., a density of 40 to 55 pounds per cubic foot, and an $^{ES}/D$ of 0.01 to 0.02;

(d) adjacent the material of (c) above and generally spaced from the material of (b) above, from 5 to 15 volume percent of a particulate material having an effective particle size of 0.35 to 0.5 mm., and smaller than the particle size of (c) above, a density of 80 to 110 pounds per cubic foot, and an $^{ES}/D$ of 0.001 to 0.01; and (e) adjacent the material of (d) above and adjacent said outlet, from 5 to 15 volume percent of a particulate material having an effective particle size of 1.5 to 5 mm. one dimension of the individual particles of this region (e) being an average of $\frac{1}{3}$ to $\frac{2}{3}$ less than the other two dimensions of said particles, whereby the particles of this region (e) lie together in generally laminar manner to support the other particulate material in said filter column, whereby liquid passing from the inlet to the outlet passes through a series of particles of generally decreasing size after region (a) above and prior to region (e) above, for depth filtration, all percentages being based on the total volume of said particulate material present.

2. The depth filter of claim 1 in which the particulate material of region (a) is made of polyester.

3. The depth filter of claim 1 in which the particulate material of region (b) is made of activated carbon.

4. The depth filter of claim 1 in which the particulate material of region (c) is slag.

5. The depth filter of claim 1 in which the particulate material of region (d) is made of calcined aluminum silicate.

6. The depth filter of claim 1 in which the particulate material of region (e) is made of crushed granite.

7. The depth filter of claim 1 in which the materials of regions (a) and (b) are substantially commingled.

8. The depth filter of claim 1 in which the materials of regions (c), (d), and (e) are sequentially and respectively of increasing densities to maintain substantial stratification of said regions upon backwashing of said depth filter, the densities of the materials of regions (c), (d) and (e) being each greater than the densities of the materials of regions (a) and (b).

9. In the depth filter which comprises a filter column having an opposed inlet and outlet, said filter column containing particulate material carried on liquid permeable bottom support means adjacent said outlet, the improvement comprising, in combination:

said particulate material being present in said filter column in the following types and proportions:

(a) adjacent the inlet end, from 0 to 12 volume percent of a particulate material having an effective particle size of 5 to 8 mm., a density of 30 to 50 pounds per cubic foot, and an $^{ES}/D$ of 0.1 to 0.2;

(b) adjacent the material of (a) above, from 30 to 70 volume percent of a particulate material having an effective particle size of 1 to 2 mm., a density of 25 to 50 pounds per cubic foot, and an $^{ES}/D$ of 0.04 to 0.07;

(c) adjacent the material of (b) above and generally spaced from said inlet, from 15 to 30 volume percent of a particulate material having an effective particle size of 0.4 to 0.8 mm., a density of 40 to 55 pounds per cubic foot, and an $^{ES}/D$ of 0.01 to 0.02;

(d) adjacent the material of (c) above and generally spaced from the material of (b) above, from 5 to 15 volume percent of a particulate material having an effective particle size of 0.35 to 0.5 mm., and smaller than the particle size of (c) above, a density of 80 to 110 pounds per cubic foot, and an $^{ES}/D$ of 0.001 to 0.01;

whereby liquid passing from the inlet to the outlet passes through a series of particles of generally decreasing size after region (a) above, for depth filtration, all percentages being based on the total volume of said particulate material present.

10. The depth filter of claim 9 in which at least 5 volume percent of the particulate material of region (a) is present, and is made of polyester.

11. The depth filter of claim 10 in which the materials of regions (a) and (b) are substantially commingled.

12. The depth filter of claim 11 in which the materials of regions (c) and (d) are sequentially and respectively of increasing densities to maintain substantial stratification of said regions upon back washing of said depth filter, the densities of the materials of regions (c) and (d) being each greater than the densities of the materials of regions (a) and (b).

13. The depth filter of claim 12 in which the particulate material of region (b) is made of activated carbon.

14. The depth filter of claim 13 in which the particulate material of region (c) is slag.

15. The depth filter of claim 14 in which the particulate material of region (d) is made of calcined aluminum silicate.

16. In a depth filter which comprises a filter column having an opposed inlet and outlet, said filter column containing particulate material, the improvement comprising, in combination;

said particulate material being present in said filter column in the following types and proportions:

(a) adjacent the inlet end, a particulate material having a density of 30 to 50 pounds per cubic foot and, commingled therewith;

(b) a particulate material having a smaller particle size and a density approximately the same as the material of ingredient (a) to permit ingredients (a) and (b) to stay commingled during backwashing of the depth filter;

(c) adjacent the material of (b) above and generally spaced from said inlet, a particulate material having a particle size less than and a density greater than the material of ingredients (b);

(d) adjacent the material of (c) above and generally spaced from the material of (b) above, a particulate material having a particle size which is smaller than and a density which is greater than the material of ingredient (c); and (e) adjacent the material of (d) above and adjacent said outlet, a layer of particulate material, the individual particles of this region (e) one dimension being an average of $\frac{1}{3}$ to $\frac{2}{3}$ less than the other two dimensions of said particles, and a particle size and density greater than that of the material of (d) above, whereby the particles of this region (e) lie together in generally laminar manner to support the other particulate material in said filter column.

17. In a depth filter which comprises a filter column having an opposed inlet and outlet, said filter column containing particulate material, the improvement comprising in combination:

said particulate material comprising and being present in said filter column in the following types and proportions:
(a) adjacent the inlet end, from about 0 to 12 volume percent of polyester;
(b) adjacent the polester, from about 30 to 70 volume percent of activated carbon;
(c) adjacent the activated carbon, from about 15 to 30 volume percent of slag;
(d) adjacent the slag, from about 5 to 15 volume percent of calcined aluminum silicate; and
(e) adjacent the calcined aluminum silicate and adjacent said outlet, about 5 to 15 volume percent of crushed granite.

18. The depth filter of claim 17 in which at least 8 volume percent of said polyester is present.

* * * * *